United States Patent
Kudo et al.

(10) Patent No.: US 10,253,416 B2
(45) Date of Patent: Apr. 9, 2019

(54) SURFACE TREATMENT AGENT FOR METAL MATERIAL AND PRODUCTION METHOD FOR SURFACE-TREATED METAL MATERIAL

(71) Applicant: NIHON PARKERIZING CO., LTD., Tokyo (JP)

(72) Inventors: Eisuke Kudo, Tokyo (JP); Yoshikazu Namai, Tokyo (JP); Daisuke Shimizu, Tokyo (JP)

(73) Assignee: NIHON PARKERIZING CO., LTD., Tokyo (JP)

( * ) Notice: Subject to any disclaimer, the term of this patent is extended or adjusted under 35 U.S.C. 154(b) by 258 days.

(21) Appl. No.: 15/029,981

(22) PCT Filed: Oct. 18, 2013

(86) PCT No.: PCT/JP2013/078385
§ 371 (c)(1),
(2) Date: Apr. 15, 2016

(87) PCT Pub. No.: WO2015/056355
PCT Pub. Date: Apr. 23, 2015

(65) Prior Publication Data
US 2016/0244884 A1    Aug. 25, 2016

(51) Int. Cl.
| | | |
|---|---|---|
| *C23C 22/05* | (2006.01) | |
| *C25D 9/02* | (2006.01) | |
| *C09D 5/08* | (2006.01) | |
| *C09D 163/00* | (2006.01) | |
| *C23C 26/00* | (2006.01) | |
| *C25D 9/08* | (2006.01) | |
| *B32B 15/092* | (2006.01) | |
| *C23C 22/34* | (2006.01) | |
| *C23C 22/50* | (2006.01) | |
| *C23C 22/53* | (2006.01) | |
| *C23C 22/56* | (2006.01) | |
| *C23C 22/58* | (2006.01) | |
| *C09D 7/61* | (2018.01) | |
| *C09D 7/63* | (2018.01) | |

(52) U.S. Cl.
CPC ............ *C23C 22/05* (2013.01); *B32B 15/092* (2013.01); *C09D 5/08* (2013.01); *C09D 7/61* (2018.01); *C09D 7/63* (2018.01); *C09D 163/00* (2013.01); *C23C 22/34* (2013.01); *C23C 22/50* (2013.01); *C23C 22/53* (2013.01); *C23C 22/56* (2013.01); *C23C 22/58* (2013.01); *C23C 26/00* (2013.01); *C25D 9/02* (2013.01); *C25D 9/08* (2013.01); *C23C 2222/20* (2013.01)

(58) Field of Classification Search
None
See application file for complete search history.

(56) References Cited

FOREIGN PATENT DOCUMENTS

| JP | 8-257494 A | 10/1996 |
|---|---|---|
| JP | 2007-162098 A | 6/2007 |
| JP | 2008-231418 A | 10/2008 |
| JP | 2009-242815 A | 10/2009 |
| JP | 2010-280972 A | 12/2010 |
| JP | 2012-1785 A | 1/2012 |

*Primary Examiner* — Catherine S Branch
(74) *Attorney, Agent, or Firm* — Muncy, Geissler, Olds & Lowe, P.C.

(57) ABSTRACT

Provided is a surface treatment agent for a metal material with which it is possible to produce a surface-treated metal material that has excellent initial anti-rust properties without being coated with an anti-rust oil, excellent lubrication properties, and excellent anti-corrosion and adhesion properties in a coating film for which phosphate-based chemical conversion treatment, zirconium-based chemical conversion treatment, or other coating underlay processing is omitted. This surface treatment agent for a metal material contains: a zirconium compound; an aqueous epoxy resin having in the skeleton thereof a carboxyl-group-containing polymer that includes a repeated unit derived from a carboxyl-group-containing vinyl monomer, said aqueous epoxy resin also having an acid value of 5-50 mg KOH/g; and a hydroxy-carboxylic acid.

23 Claims, No Drawings

SURFACE TREATMENT AGENT FOR METAL MATERIAL AND PRODUCTION METHOD FOR SURFACE-TREATED METAL MATERIAL

TECHNICAL FIELD

The present invention relates to a surface-treating agent for metallic materials, particularly to a surface-treating agent for metallic materials that contains a zirconium compound, an aqueous epoxy resin and a hydroxycarboxylic acid in predetermined amounts.

The present invention also relates to a method of producing surface-treated metallic materials using the surface-treating agent for metallic materials.

BACKGROUND ART

In general, metallic materials having been manufactured are applied with rust preventive oil to avoid rusting until used at destinations where the materials are demanded (hereinafter referred to also as "to have initial rust resistance"). Typically, rust preventive oil is removed by degreasing treatment in advance of painting treatment, at such destinations. Meanwhile, the omission of degreasing treatment is advantageous in terms of environmental aspects related to effluent and industrial waste treatments and in terms of costs for management, chemicals, equipment and the like, and therefore steel sheets having excellent initial rust resistance even without rust preventive oil have been desired.

As a steel sheet having excellent initial rust resistance, for example, Patent Literature 1 describes a surface-treated steel sheet having on its surface a rust preventive film formed using Zn as a base, with the uppermost layer of the rust preventive film being an amorphous oxide layer composed of Zn, P and Si.

When painted, metallic materials are typically subjected to surface preparation treatment prior to painting, and resultant undercoats can enhance painting properties (corrosion resistance and adhesion of paint films).

The surface preparation treatment generally involves phosphate-based or zirconium-based chemical conversion treatment that follows a degreasing step, and when painting on constructs made of sheet metal, such as vehicle bodies, is assumed, such constructs are assembled after steps of cutting, pressing and joining of steel sheets, and then subjected to the surface preparation treatment. As with the degreasing step, the surface preparation treatment is desired to be omitted in terms of environment, costs and production efficiency.

Patent Literature 2 proposes an organic coated steel sheet that is excellent in initial rust resistance and lubrication with an organic coating alone, i.e., without application of rust preventive oil or lubricant oil, and is excellent in electrodeposition painting properties with the organic coating remaining on its surface, i.e., without removal of the coating by using, for instance, alkali and hot water.

CITATION LIST

Patent Literature

Patent Literature 1: JP 2009-242815 A
Patent Literature 2: JP 8-257494 A

SUMMARY OF INVENTION

Technical Problems

As described above, metallic materials are finished to obtain final steel products through a number of steps. With those steps, problems about production efficiency, working environment, waste reduction and the like are constantly come up, and the omission of any step is likewise constantly discussed.

The technique of Patent Literature 1 teaches imparting initial rust resistance to cold rolled steel sheets without rust preventive oil, thereby omitting the degreasing step for removing rust preventive oil. However, this technique only improves initial rust resistance of cold rolled steel sheets and does not influence the properties of painted steel sheets. Therefore, the surface preparation step such as phosphate-based chemical conversion treatment cannot be omitted.

Patent Literature 2 describes a technique with which all of alkali degreasing and surface preparation treatment such as chemical conversion treatment can be omitted. The organic coated steel sheet obtained is sufficiently excellent in primary rust resistance and lubrication but, in relation to the initial rust resistance, the corrosion resistance under much severer conditions of, for example, a salt spray test than conditions of a humidity cabinet test is not considered. In addition, while the adhesion after electrodeposition painting is taken into account, the corrosion resistance after that is not considered.

When painting on metallic materials, e.g., constructs made of sheet metal such as vehicle bodies is assumed as described above, there has not been developed yet a treatment technique that is suitable for any purpose and can impart much better properties in terms of initial rust resistance and lubrication of metallic materials as well as corrosion resistance and adhesion of paint films with the surface preparation treatment being omitted, as compared to the properties of products having undergone conventional treatments.

The present invention is provided to solve the foregoing problems seen in the related art, and an object of the invention is to provide a surface-treating agent for metallic materials that makes it possible to produce surface-treated metallic materials having excellent initial rust resistance without application of rust preventive oil as well as excellent lubrication and that allows paint films to have excellent corrosion resistance and adhesion even when the surface preparation treatment such as phosphate-based or zirconium-based chemical conversion treatment is omitted.

Another object of the invention is to provide a method of producing surface-treated metallic materials using the surface-treating agent for metallic materials.

Solution to Problems

The present inventors have made an intensive study on the foregoing problems and as a result found that the desired effects are obtained by using a zirconium compound, an aqueous epoxy resin and a hydroxycarboxylic acid in predetermined amounts.

More specifically, the foregoing objects can be achieved by the characteristic features below.

(1) A surface-treating agent for metallic materials, comprising:
a zirconium compound (A);
an aqueous epoxy resin (B) having, in its skeleton, a carboxyl group-containing polymer containing a repeating unit derived from a carboxyl group-containing vinyl monomer, and having an acid value of 5 to 50 mg KOH/g; and
a hydroxycarboxylic acid (C),
wherein following conditions (I) and (II) are satisfied:
(I) a ratio between a mass of Zr derived from the zirconium compound (A) ($A_{Zr}$) and a mass of the aqueous epoxy resin (B) ($A_{Zr}/B$) is 0.08 to 6.6; and
(II) a ratio between the mass of the aqueous epoxy resin (B) and a mass of the hydroxycarboxylic acid (C) (C/B) is 0.008 to 0.7.
(2) The surface-treating agent for metallic materials according to (1) further comprising:
a silane compound (D).
(3) The surface-treating agent for metallic materials according to (1) or (2) further comprising:
an aqueous lubricant (E).
(4) A method of producing a surface-treated metallic material, comprising:
a coating formation step of forming a coating on a metallic material to obtain a surface-treated metallic material by bringing the surface-treating agent for metallic materials according to any one of (1) to (3) into contact with a surface of the metallic material.
(5) The method according to (4), wherein the coating has a thickness of 0.3 to 5.0 μm.
(6) The method according to (4) or (5), further comprising:
a step of, prior to the coating formation step, bringing the surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom.

Advantageous Effects of Invention

The present invention provides a surface-treating agent for metallic materials that makes it possible to produce surface-treated metallic materials having excellent initial rust resistance without application of rust preventive oil as well as excellent lubrication and that allows paint films to have excellent corrosion resistance and adhesion even when the surface preparation treatment such as phosphate-based or zirconium-based chemical conversion treatment is omitted.

The present invention also provides a method of producing surface-treated metallic materials using the surface-treating agent for metallic materials.

DESCRIPTION OF EMBODIMENTS

The surface-treating agent for metallic materials and the method of producing surface-treated metallic materials according to the invention are described below.

The surface-treating agent for metallic materials contains at least a zirconium compound (A), an aqueous epoxy resin (B) and a hydroxycarboxylic acid (C).

First of all, various components making up the surface-treating agent for metallic materials are described.

<Zirconium Compound>

The zirconium compound (A) is present mainly in the form of zirconium oxide in coatings formed on metallic materials through coating. Accordingly, coatings having high chemical resistance to acids, alkalis and the like can be obtained.

The zirconium compound (A) is not particularly limited in type as long as it contains a zirconium atom, and examples thereof include basic zirconium carbonate, zirconium carbonate salts such as sodium zirconium carbonate, potassium zirconium carbonate, lithium zirconium carbonate, and ammonium zirconium carbonate, zirconium hydroxide, zirconium lactate, zirconium acetate, zirconium nitrate, zirconium sulfate, zirconium chloride, calcium zirconate, zirconium ethoxide, and zirconium hexafluoroacetylacetonato.

Of these, zirconium ammonium carbonate and zirconium sodium carbonate are preferred in terms of excellent corrosion resistance.

<Aqueous Epoxy Resin (B)>

The aqueous epoxy resin (B) has, in its skeleton, a carboxyl group-containing polymer containing a repeating unit derived from a carboxyl group-containing vinyl monomer. In other words, the aqueous epoxy resin (B) contains the carboxyl group-containing polymer chain as a part of the structure.

An aqueous epoxy resin containing the carboxyl group-containing polymer has excellent water dispersibility, and in addition, enables the formation of an organic-inorganic composite coating film that is highly dense and has high crosslink density because, during coating, the carboxyl group in the carboxyl group-containing polymer present in the aqueous epoxy resin (B) has crosslinking points not only with a metallic material, which is a base material, but also with the zirconium compound (A), metal alkoxide and other components present in the treating agent. Furthermore, the addition of the carboxyl group-containing polymer to an aqueous epoxy resin reduces the hardness of a rigid epoxy resin film, which makes it possible to form a coating that is adaptable to pressing without impairing high barrier properties obtained by the aqueous epoxy resin (B) and the zirconium compound (A).

The term "carboxyl group-containing polymer" refers to a polymer containing a repeating unit derived from a carboxyl group-containing vinyl monomer, which will be described later.

The amount of the repeating unit in the carboxyl group-containing polymer is not particularly limited, and is preferably from 0.01 to 100 mol % and more preferably from 0.1 to 80 mol % with respect to all the repeating units in the carboxyl group-containing polymer.

The carboxyl group-containing polymer may contain other repeating units than the repeating unit derived from a carboxyl group-containing vinyl monomer. In other words, repeating units derived from other vinyl monomers than the carboxyl group-containing vinyl monomer may be present. Other vinyl monomers are described later in detail.

The content of the carboxyl group-containing polymer contained in the skeleton of the aqueous epoxy resin (B) is not particularly limited and preferably ranges from 0.1 to 20 mass %.

The acid value, which is an index of water dispersibility, of the aqueous epoxy resin (B) is 5 to 50 mg KOH/g, and a range of 15 to 45 mg KOH/g is more preferred because at least one of initial rust resistance, lubrication, corrosion resistance of paint films, and adhesion of paint films is further excellent (hereinafter simply referred to as "because the effect(s) of the invention is more excellent"). When the acid value is less than 5 mg KOH/g, the absolute amount of crosslinking points of the aqueous epoxy resin (B) is too small, which leads to insufficient crosslinking between the zirconium compound (A) and the aqueous epoxy resin (B), thereby degrading initial rust resistance of metallic materials and corrosion resistance and adhesion of paint films, and in addition, water dispersibility is unstable due to a shortage of carboxyl group, which is hydrophilic group. With the acid value of more than 50 mg KOH/g, while the water dispersibility of the aqueous epoxy resin (B) is sufficiently stable, the amount of carboxyl group is excessive and this reduces water resistance of coatings as well as degrading initial rust resistance of metallic materials and adhesion of paint films.

The acid value is measured by potentiometric titration according to JIS K 0070-1992.

The weight-average molecular weight of the aqueous epoxy resin (B) is not particularly limited and is preferably at least 10,000 and more preferably at least 20,000 because the effect(s) of the invention is more excellent. The upper limit thereof is not particularly limited and is preferably 1,000,000 or less in terms of dispersion stability of the surface-treating agent for metallic materials. The weight-average molecular weight within the foregoing ranges minimizes the increase in viscosity during synthesis of resin, resulting in good workability.

The weight-average molecular weight is measured as a polystyrene-equivalent value by gel permeation chromatography.

The glass transition temperature (Tg) of the aqueous epoxy resin (B) is not particularly limited and is preferably 50 to 100° C. because the effect(s) of the invention is more excellent.

The glass transition temperature is measured by differential scanning calorimetry according to JIS K 7121-1987.

The epoxy equivalent of the aqueous epoxy resin (B) is not particularly limited and is preferably at least 5,000 and more preferably at least 10,000 because the effect(s) of the invention is more excellent.

The epoxy equivalent is calculated through the measurement according to JIS K 7236-2001.

The method of producing the aqueous epoxy resin (B) is not particularly limited, and any known method is applicable.

For example, firstly, epoxy resin is at least reacted with at least one selected from the group consisting of glycidyl group-containing vinyl monomers, amido group-containing vinyl monomers, amino group-containing vinyl monomers, and glycidyl ethers of polyalkylene glycols in the presence of an optionally added amine, to thereby obtain a product X. Thereafter, in one exemplary method, the carboxyl group-containing vinyl monomer is polymerized with the product X. In other words, the aqueous epoxy resin is a polymer obtained by reacting the carboxyl group-containing vinyl monomer with the product X, and more specifically, is obtained by polymerizing the carboxyl group-containing vinyl monomer in the presence of the product X. The carboxyl group-containing vinyl monomer may react with the product X through any type of reaction and for instance, reacts with the product X via vinyl group introduced into the product X. With this embodiment, the effect(s) of the invention is more excellent.

The epoxy resin used in production of the product X is not particularly limited in type as far as it contains epoxy group.

For instance, the epoxy resin is used that is obtained by reacting a compound W selected from the group consisting of compounds having two or more hydroxylphenyl groups in the molecule and alkylene glycol, with epichlorohydrin.

In the reaction, a catalyst may be optionally added. In other words, the reaction may be carried out in the presence of a catalyst. Exemplary catalysts include, in addition to basic metal salts such as sodium hydroxide and sodium methoxide, amine compounds such as dimethylbenzylamine and tributylamine, and onium salts such as tetramethylammonium bromide, tetrabutylammonium bromide and tetraphenylphosphonium chloride.

In the reaction, a solvent (water or organic solvent) may be used as needed.

For the glycidyl group-containing vinyl monomer used in production of the product X, any of various known compounds may be used without limitation as long as it contains glycidyl group and polymerizable vinyl group in the molecule. Specific examples thereof include glycidyl (meth)acylate, β-methyl glycidyl (meth)acrylate and (meth)allyl glycidyl ether.

For the amido group-containing vinyl monomer, any of various known compounds may be used without limitation as long as it contains amido group and polymerizable vinyl group in the molecule. Specific examples thereof include acrylamide, N-butoxymethyl(meth)acrylamide, N-methyl (meth)acrylamide, N,N-dimethyl(meth)acrylamide, N-isopropyl(meth)acrylamide, diacetone(meth)acrylamide and N-vinylformamide.

For the amino group-containing vinyl monomer, any of various known compounds may be used without limitation as long as it contains amino group and polymerizable vinyl group in the molecule. Specific examples thereof include N,N-dimethylaminoethyl (meth)acrylate, N,N-diethylaminoethyl (meth)acrylate and N,N-dimethylaminopropyl (meth)acrylate.

The glycidyl ethers of polyalkylene glycols are polyalkylene glycols having glycidyl group at at least one end and preferably including no aromatic cyclic group in the molecule. The polyalkylene glycols for use is exemplified by known ones such as, for instance, polyethylene glycol, polypropylene glycol and polybutylene glycol.

The epoxy equivalent of glycidyl ether of polyalkylene glycol is not particularly limited, and is preferably 3,000 or less because the effect(s) of the invention is more excellent.

The type of the amine is not particularly limited and any of various known amines may be used without limitation. Examples thereof include alkanolamines, aliphatic amines, aromatic amines, alicyclic amines and aromatic nuclear-substituted aliphatic amines, from among which one or more may be suitably selected for use.

The types of the amines are specifically listed below. Exemplary alkanolamines include diethanolamine, diisopropanolamine, di-2-hydroxybutylamine, N-methylethanolamine, N-ethylethanolamine and N-benzylethanolamine. Exemplary aliphatic amines include primary amines such as ethylamine, propylamine, butylamine, hexylamine, laurylamine, stearylamine, palmitylamine, oleylamine and erucylamine, and secondary amines such as diethylamine, dipropylamine and dibutylamine. Exemplary aromatic amines include toluidines, xylidines, cumidines (isopropylanilines), hexylanilines, nonylanilines and dodecylanilines. Exemplary alicyclic amines include cyclopentylamines, cyclohexylamines, and norbornylamines. Exemplary aromatic nuclear-substituted aliphatic amines include benzylamines and phenethylamines.

The conditions for production of the product X are not particularly limited, and the optimal conditions are selected in accordance with used materials.

The reaction temperature is not particularly limited and is preferably 30 to 150° C. and more preferably 50 to 150° C. because the reaction proceeds more efficiently. The reaction time is not particularly limited and is preferably 1 to 24 hours in terms of productivity.

The carboxyl group-containing vinyl monomer is exemplified by acrylic acid, methacrylic acid, maleic acid, maleic anhydride, fumaric acid, and itaconic acid.

In the reaction with the carboxyl group-containing vinyl monomer, another vinyl monomer may also be used. Examples of such optional vinyl monomers that are polymerizable with the carboxyl group-containing vinyl monomer include acrylic esters such as methyl acrylate, ethyl acrylate, n-propyl acrylate, n-butyl acrylate, isobutyl acrylate, tert-butyl acrylate and 2-ethylhexyl acrylate, methacrylic esters such as methyl methacrylate, ethyl methacrylate, n-propyl methacrylate, n-butyl methacrylate, isobutyl methacrylate, tert-butyl methacrylate and 2-ethylhexyl methacrylate, styrene vinyl monomers such as styrene, vinyltoluene and α-methylstyrene, vinyl acetate, β-hydroxyethyl acrylate, acrylonitrile, and methacrylonitrile. These vinyl monomers may be used alone or in combination of two or more.

The conditions for polymerization of the product X and the carboxyl group-containing vinyl monomer are not particularly limited, and the optimal embodiment is selected in accordance with used compounds. For instance, the polymerization can be carried out at a reaction temperature of about 60° C. to about 150° C. in the presence of a polymerization initiator.

The mass ratio between the amount of the product X and the total amount of the carboxyl group-containing vinyl monomer and other vinyl monomers (product X/[(carboxyl group-containing vinyl monomer)+(other vinyl monomers)]) is adjusted to allow the acid value to fall within the foregoing ranges, and in general, preferably adjusted to a range from 0.01 to 0.5.

The mass ratio between the carboxyl group-containing vinyl monomer and all vinyl monomers (mass of carboxyl group-containing vinyl monomer/total mass of carboxyl group-containing vinyl monomer and other vinyl monomers) is not particularly limited, and is preferably 0.001 to 0.1 because the effect(s) of the invention is more excellent.

<Hydroxycarboxylic Acid (C)>

The hydroxycarboxylic acid (C) serves to keep the zirconium compound (A) stable in the surface-treating agent for metallic materials and to establish crosslinking points between the zirconium compound (A) and the aqueous epoxy resin (B) during coating. In addition, the hydroxycarboxylic acid (C) serves to chelate metal ions derived from a metallic material that are eluted in a trace amount when the metallic material is continuously treated with the surface-treating agent for metallic materials according to the invention.

The hydroxycarboxylic acid (C) is not particularly limited in type as long as it is a compound having hydroxy group and carboxyl group, and examples thereof include lactic acid, tartaric acid, citric acid, malic acid and gluconic acid. Of these, preferred are tartaric acid, citric acid and malic acid, each of which contains two or more carboxyl groups.

As the hydroxycarboxylic acid (C), the acids above may be used alone or in combination of two or more.

<Surface-Treating Agent for Metallic Materials>

The surface-treating agent for metallic materials contains at least the components (A) to (C) described above, and satisfies the following conditions (I) and (II):

Condition (I): The ratio between the mass of Zr derived from the zirconium compound (A) ($A_{Zr}$) and the mass of the aqueous epoxy resin (B) ($A_{Zr}/B$) is 0.08 to 6.6.

Condition (II): The ratio between the mass of the aqueous epoxy resin (B) and the mass of the hydroxycarboxylic acid (C) (C/B) is 0.008 to 0.7.

The ratio between the mass of Zr derived from the zirconium compound (A) ($A_{Zr}$) and the mass of the aqueous epoxy resin (B) ($A_{Zr}/B$) is 0.08 to 6.6, and a range of 0.18 to 4.5 is preferred because the effect(s) of the invention is more excellent.

With a ratio ($A_{Zr}/B$) of less than 0.08, the zirconium compound (A) content is too low, which leads to low crosslink density so that high barrier properties are not achieved, resulting in degradation of initial rust resistance of metallic materials and corrosion resistance and/or adhesion of paint films. With a ratio ($A_{Zr}/B$) of more than 6.6, the zirconium compound (A) content with respect to the aqueous epoxy resin (B) is too high, so that coatings are likely to be brittle and cracks may occur, resulting in degradation of initial rust resistance of metallic materials and corrosion resistance and/or adhesion of paint films. Brittle coatings lead also to reduced lubrication of metallic materials.

The phrase "the mass of Zr derived from the zirconium compound (A)" herein means the mass of a Zr component (elemental zirconium) present in the zirconium compound (A).

The ratio between the mass of the aqueous epoxy resin (B) and the mass of the hydroxycarboxylic acid (C) (C/B) is 0.008 to 0.7, and a range of 0.02 to 0.3 is preferred because the effect(s) of the invention is more excellent.

With a ratio (C/B) of less than 0.008, the improvement in crosslink density between the zirconium compound (A) and the aqueous epoxy resin (B) is not achieved, thus reducing initial rust resistance, alkaline resistance and pre-painting treating agent resistance of metallic materials and adhesion of paint films. With a ratio (C/B) of more than 0.7, the mass of the hydroxycarboxylic acid (C) is excessive, which leads to reduction not only in water resistance of coatings but also in initial rust resistance of metallic materials and adhesion of paint films.

<Other Components>

The surface-treating agent for metallic materials according to the present invention may contain other components than the components (A) to (C) described above.

For example, the surface-treating agent for metallic materials according to the invention may further contain a silane compound (D). The silane compound (D) further enhances the crosslink density of coatings, thereby improving initial rust resistance of metallic materials and corrosion resistance and adhesion of paint films.

The silane compound is not particularly limited in type, and use may be made of at least one selected from an alkoxysilane, a silane coupling agent, and their hydrolysates and condensates. Examples thereof include: epoxysilanes such as 3-glycidoxypropyltrimethoxysilane, 3-glycidoxypropylmethyldimethoxysilane and 2-(3,4-epoxycyclohexyl)ethyltrimethoxysilane; aminosilanes such as N-(2-aminoethyl) 3-aminopropylmethyldimethoxysilane, N-(aminoethyl)3-aminopropyltrimethoxysilane and 3-aminopropyltriethoxysilane; mercaptosilanes such as 3-mercaptopropyltrimethoxysilane; isocyanate silanes such as 3-isocyanatepropyltrimethoxysilane and 3-isocyanatepropyltriethoxysilane; and vinyl group-containing silanes such as vinyltriethoxysilane and p-styryltrimethoxysilane. In particular, a silane compound containing alkyl group having 1 to 2 carbon atoms is preferred.

The silane compound (D) content is preferably 0.1 to 20 mass % and more preferably 0.5 to 15 mass % with respect to the solid content of the surface-treating agent for metallic materials because the effect(s) of the invention is more excellent. The term "solid" herein refers to other components than a solvent in the surface-treating agent for metallic materials.

The surface-treating agent for metallic materials according to the present invention may further contain an aqueous lubricant (E). The addition of the aqueous lubricant (E) allows the surface-treated metallic material to have further improved press workability.

The aqueous lubricant (E) is not particularly limited in type, and examples thereof include: polyolefin waxes such as polyethylene wax and polypropylene wax; paraffin waxes such as synthetic paraffin and natural paraffin; microcrystalline wax; and fatty acid amide compounds such as stearamide, palmitamide, methylenebisstearamide and oleamide.

The aqueous lubricant (E) content is preferably 0.1 to 30 mass % and more preferably 0.5 to 20 mass % with respect to the solid content of the treating agent. With the aqueous lubricant (E) content within the foregoing ranges, the surface-treating agent provides more excellent lubrication and lower friction coefficient which is favorable. Accordingly, in taking up surface-treated metallic materials, the possibility of occurrence of coil crushing or the like decreases.

The surface-treating agent for metallic materials according to the present invention may further contain a known resin curing component. The addition of a resin curing component (particularly, an aqueous resin curing component) further increases the cure degree of the aqueous epoxy resin (B), thereby improving initial rust resistance of metallic materials and corrosion resistance of paint films.

The resin curing component is not particularly limited in type, and examples thereof include amino resins, blocked isocyanate compounds, carbodiimide compounds and oxazoline compounds. To be more specific, exemplary amine resins include ones in which n-butylated melamine resin, isobutylated melamine resin, methylated melamine resin, benzoguanamine resin such as butylated benzoguanamine resin, and the like, are water-dispersed with an emulsifier. Exemplary blocked isocyanates include ones in which hexamethylene diisocyanate, isophorone diisocyanate and tolylene diisocyanate are blocked by, for instance, an alcohol or amine blocking agent. Exemplary carbodiimide compounds include N,N-dicyclohexylcarbodiimide, N,N-diisopropylcarbodiimide, N,N-diisopropylphenylcarbodiimide, and N-ethyl-N'-1(3-dimethylaminopropyl)-carbodiimide hydrochloride (Carbodilite series, available from Nisshinbo Holdings Inc.). Exemplary oxazoline compounds include oxazoline group-containing, styrene or acrylic resins (Epocros series, available from Nippon Shokubai Co., Ltd.).

For the aqueous curing agent, melamine resin is particularly preferred for use. When melamine resin is used, the content thereof is preferably 5 to 40 parts by mass and more preferably 5 to 30 mass % with respect to 100 parts by mass of the solid content of the aqueous epoxy resin (B) in the treating agent. The content within the foregoing ranges leads to excellent initial rust resistance of metallic materials and excellent corrosion resistance and adhesion of paint films.

The surface-treating agent for metallic materials according to the present invention may further contain a known pigment. The addition of a pigment (particularly, a rust preventive pigment) enhances scratch resistance of coatings, thereby improving initial rust resistance of metallic materials and corrosion resistance of paint films.

The pigment component is not particularly limited in type, and examples thereof include a zinc phosphate pigment, an aluminum phosphate pigment, a calcium phosphate pigment, a magnesium phosphate pigment, a vanadium pentoxide pigment, a zinc molybdate pigment, a strontium molybdate pigment, an aluminium phosphomolybdate pigment, a calcium silica pigment and a silica pigment.

When a pigment component is used, at least one of the foregoing pigments may be used, and the total content thereof is preferably 1.0 to 65 mass % and more preferably 1.0 to 50 mass % with respect to the solid content of the surface-treating agent for metallic materials. The content within the foregoing ranges leads to excellent initial rust resistance of metallic materials and excellent corrosion resistance and adhesion of paint films.

The surface-treating agent for metallic materials according to the present invention may further contain a solvent (e.g., water).

The surface-treating agent for metallic materials according to the invention is preferably produced by mixing with stirring the foregoing components in water such as deionized water or distilled water. The solid percentage of the surface-treating agent may be suitably selected.

The surface-treating agent for metallic materials according to the present invention may further contain a plasticizer. The plasticizer is not particularly limited in type, and preferred is a plasticizer containing at least one ester bond and/or at least one ether bond in the molecule.

The pH of the surface-treating agent for metallic materials is not particularly limited. For pH adjustment, use may be made of, for instance, ammonia or its salt, phosphoric acid or its salt, and nitric acid or its salt.

In addition, such additives as an alcohol, a ketone, a cellosolve, an amine-type water-soluble solvent, an antifoaming agent, an antimicrobial and antifungal agent, a colorant, a wettability improving agent for uniform coating, and a surfactant may be added to the surface-treating agent for metallic materials as needed. However, it is important to add these additives in such amounts that the quality achieved by the present invention is not impaired, and their contents are preferably less than 5 mass % with respect to the total solid content of the surface-treating agent for metallic materials, at most.

<Method of Producing Surface-Treated Metallic Materials>
(Coating Formation Step)

The method of producing the surface-treated metallic materials using the surface-treating agent for metallic materials as described above is not particularly limited, and usually involves a step of forming a coating on a metallic material by bringing the surface-treating agent for metallic materials as above into contact with a surface of the metallic material.

In the following description, the metallic material, which is a material to be treated, is detailed first and then the coating formation is detailed.

(Metallic Material)

The metallic material used is not particularly limited in type, and any known metallic material can be used. Examples thereof include ferrous materials, plated materials, zinc-based materials, aluminum-based materials and magnesium-based materials. More specific examples thereof include iron plate, zinc plate, cold rolled steel sheet, hot rolled steel sheet, hot-dip galvanized steel sheet, electrogalvanized steel sheet, hot-dip galvannealed steel sheet, aluminum-plated steel sheet, aluminum-zinc alloy-plated steel sheet, tin-zinc alloy-plated steel sheet, zinc-nickel alloy-plated steel sheet, stainless steel sheet, aluminum plates (including aluminum alloy plates in addition to plates made of aluminum alone), copper plate, titanium plate, and magnesium plate.

The metallic material may have a three-dimensional shape as in constructs made of sheet metal.

(Contact Method)

The method of bringing the surface-treating agent for metallic materials into contact with the metallic material is not particularly limited, and the agent may be applied by, for instance, roll coating, curtain flow coating, air spray coating, airless spray coating, immersing, bar coating or brush coating.

The drying temperature and the drying time after the application of the surface-treating agent for metallic materials are not particularly limited as long as they allow a solvent (e.g., water) to be dried up.

The coating thickness is preferably 0.3 to 5.0 μm and more preferably 0.5 to 3.0 μm because the effect(s) of the invention is more excellent.

(Surface Preparation Step)

The method of producing the surface-treated metallic material according to the present invention preferably further involves, prior to the coating formation step, a step of bringing a surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom, because the effect(s) of the invention is more excellent. The solution may contain both of the metal ion and the metal compound.

The contact method is not particularly limited, and usable methods include a method in which the solution is applied on the metallic material and a method in which the metallic material is immersed in the solution. Exemplary application methods include methods using devices such as a roll coater and a spray.

During contact, a metallic material surface and the solution may interact so that a chemical reaction proceeds. In other words, the surface preparation treatment may be carried out by chemical conversion treatment.

Alternatively, when the metallic material is in contact with the solution, cathodic electrolysis may be performed.

In addition, the contact treatment above may optionally be followed by rinsing treatment in which the metallic material is rinsed with water.

The solution used in the surface preparation step (hereinafter also called "surface preparation treatment solution") is not particularly limited as long as it contains a metal ion of at least one metal atom selected from the group consisting of Mo, W, Y, Bi, Mn, La, Ce, Sm, Zn, AL, Si, Ni, Co, Zr, Mg, Ti and V or a metal compound including the one metal atom, and preferably contains a metal ion of at least one metal atom selected from the group consisting of Zn, AL, Si, Ni, Co, Zr, Mg and Ti or a metal compound including the one metal atom, for an economical reason.

The metal compound including the metal atom is not particularly limited in type as long as it contains the metal, and examples thereof include metal oxides and/or metal alkoxides containing metal atoms mentioned above.

The supply source of metal ions may be at least one metal compound selected from, for instance, nitrates, sulfates, hydrochlorides, carbonates, phosphates, fluorine compounds, ammonium salts and acetonates of Mo, W, Y, Bi, Mn, La, Ce, Sm, Zn, AL, Si, Ni, Co, Zr, Mg, Ti and V. Of these, compounds that dissolve in an aqueous acid or alkali solution are preferred.

Exemplary supply sources of metal oxides and/or metal alkoxides include oxide colloids and alkoxides or their hydrolysates of Mo, W, Y, Bi, Mn, La, Ce, Sm, Zn, AL, Si, Ni, Co, Zr, Mg, Ti and V. Of these, compounds that disperse in an aqueous acid or alkali solution are preferred.

The surface preparation treatment solution is not particularly limited in pH as long as it contains a metal ion and/or a metal oxide as above. Exemplary pH adjusters include: at least one acid component selected from nitric acid, sulfuric acid, acetic acid, hydrochloric acid, formic acid, hydrofluoric acid, phosphoric acid and tartaric acid; and at least one alkali component selected from ammonia, ammonium salt, amine, amine salt, sodium hydroxide and potassium hydroxide.

The surface preparation treatment solution is obtained by mixing the foregoing components in water such as deionized water or distilled water, and the total concentration of all ions and metal oxides is preferably 0.1 to 500 g/L in terms of adhesion and costs.

For the surface preparation treatment, it is preferable to employ the foregoing immersing method in which the metallic material is immersed in the surface preparation treatment solution to contact the material with the solution. Aside from that, in the case of chemical conversion treatment (in which the treating agent is caused to act on a surface of the metallic material to induce a chemical reaction), spraying may be employed as a method of bringing the metallic material into contact with a chemical conversion treatment solution, and the solution temperature is preferably 20 to 60° C. in terms of adhesion and costs.

When cathodic electrolysis is performed, the current density is preferably 0.1 to 20.0 $A/dm^2$ and more preferably 1.0 to 15.0 $A/dm^2$.

The coating weight of thus-formed undercoat is preferably 1 to 1000 $mg/m^2$ and more preferably 2 to 800 $mg/m^2$ in terms of the total weight of metals because this leads to more excellent coating properties and for reasons of coating properties and costs.

Assuming the use of a coil line, the treatment time of the surface preparation treatment is preferably up to 10 seconds and more preferably 0.5 to 6 seconds.

(Method of Painting on Surface-Treated Metallic Material)

Steps carried out before a painting step for the surface-treated metallic material obtained by the foregoing production method are not particularly limited, and the painting step may follow, for instance, a cutting step, a pressing step, and a joining step involving welding. The painting step is not particularly limited as long as it is carried out using known treatment facilities under known conditions. When the metallic material is formed into a construct made of sheet metal, the construct is preferably subjected to alkali degreasing, rinsed with water, and then painted by electrodeposition. In this case, since the surface-treated metallic material is not applied with rust preventive oil, alkali degreasing to remove dirt and remains generated in pressing is preferably carried out at low concentration and low temperature and in a short period of time.

Furthermore, in light of the objects of the invention, it is desirable to omit phosphate-based or zirconium-based chemical conversion treatment, which is the surface preparation treatment prior to painting; however, even when not omitted and carried out as in a conventional manner, the surface preparation treatment involving a degreasing step does not have an influence such as damaging a coating formed on the metallic material or degrading painting properties.

Employing the process described above enables the reduction of an alkali solution used in alkali degreasing, the reduction of effluent, and the omission of chemical conversion step, which is the surface preparation treatment, in a step of producing constructs made of sheet metal and a step of painting such constructs. Electrodeposition painting is selected for painting because it is excellent as a method of painting a whole construct made of sheet metal having a complex structure, e.g., a bag structure, with good throwing power.

EXAMPLES

The present invention is described below more specifically by way of examples and comparative examples. The examples are given merely by way of illustration of the present invention and should not be construed as limiting the invention.

Firstly, production examples of the aqueous epoxy resin (B) of the invention are described below.

(1) Synthesis of Aqueous Epoxy Resins (B1) to (B7)

Synthesis of Aqueous Epoxy Resin (B1)

To a flask having a condenser were added 114 parts by mass of 2,2-bis(4-hydroxyphenyl)propane, 56 parts by mass of epichlorohydrin, and 17 parts by mass of tetrabutylammonium bromide, and the mixture was reacted at 70° C. for 24 hours. Subsequently, the reaction solution was cooled to room temperature, 12 parts by mass of a 20% aqueous sodium hydroxide solution was added thereto, and the mixture was reacted at room temperature for about 5 hours. Then, a reaction product was extracted with chloroform.

To 590 parts by mass of the reaction product were added 43 parts by mass of glycidyl methacylate and 7 parts by mass of dimethylbenzylamine, and the mixture was reacted at 130° C. for 4 hours to obtain a reaction product (a1).

To 100 parts by mass of the reaction product (a1), a mixture including 800 parts by mass of mixture having a mass ratio of methyl methacrylate/2-hydroxyethyl methacrylate/n-butyl acrylate/acrylic acid of 500:260:128:3.6 and 10 parts by mass of t-butylperoxy-2-ethylhexanoate was added dropwise over a period of 2 hours and reacted for 4 hours. Thereafter, the reaction solution was cooled to 80° C., and 5 parts by mass of triethylamine and 1200 parts by mass of deionized water were sequentially added thereto and mixed to obtain an aqueous epoxy resin (B1).

The aqueous epoxy resin (B1) had a weight-average molecular weight of 30000, an epoxy equivalent of 15000, an acid value of 3 mg KOH/g, and a glass transition temperature of 75° C.

Synthesis of Aqueous Epoxy Resin (B2)

To a flask having a condenser were added 114 parts by mass of 2,2-bis(4-hydroxyphenyl)propane, 56 parts by mass of epichlorohydrin, and 17 parts by mass of tetrabutylammonium bromide, and the mixture was reacted at 70° C. for 24 hours. Subsequently, the reaction solution was cooled to room temperature, 12 parts by mass of a 20% aqueous sodium hydroxide solution was added thereto, and the mixture was reacted at room temperature for about 5 hours. Then, a reaction product was extracted with chloroform.

To 590 parts by mass of the reaction product were added 43 parts by mass of glycidyl methacylate and 7 parts by mass of dimethylbenzylamine, and the mixture was reacted at 130° C. for 4 hours to obtain a reaction product (a2).

To 100 parts by mass of the reaction product (a2), a mixture including 1800 parts by mass of mixture having a mass ratio of methyl methacrylate/2-hydroxyethyl methacrylate/n-butyl acrylate/acrylic acid of 1200:390:384:36 and 10 parts by mass of t-butylperoxy-2-ethylhexanoate was added dropwise over a period of 2 hours and reacted for 4 hours. Thereafter, the reaction solution was cooled to 80° C., and 5 parts by mass of triethylamine and 4500 parts by mass of deionized water were sequentially added thereto and mixed to obtain an aqueous epoxy resin (B2).

The aqueous epoxy resin (B2) had a weight-average molecular weight of 63000, an epoxy equivalent of 31500, an acid value of 13 mg KOH/g, and a glass transition temperature of 80° C.

Synthesis of Aqueous Epoxy Resin (B3)

To a flask having a condenser were added 114 parts by mass of 2,2-bis(4-hydroxyphenyl)propane, 56 parts by mass of epichlorohydrin, and 17 parts by mass of tetrabutylammonium bromide, and the mixture was reacted at 70° C. for 24 hours. Subsequently, the reaction solution was cooled to room temperature, 12 parts by mass of a 20% aqueous sodium hydroxide solution was added thereto, and the mixture was reacted at room temperature for about 5 hours. Then, a reaction product was extracted with chloroform.

To 590 parts by mass of the reaction product were added 43 parts by mass of glycidyl methacylate and 7 parts by mass of dimethylbenzylamine, and the mixture was reacted at 130° C. for 4 hours to obtain a reaction product (a3).

To 100 parts by mass of the reaction product (a3), a mixture including 2500 parts by mass of mixture having a mass ratio of methyl methacrylate/2-hydroxyethyl methacrylate/acrylic acid of 100:2600:72 and 10 parts by mass of t-butylperoxy-2-ethylhexanoate was added dropwise over a period of 2 hours and reacted for 4 hours. Thereafter, the reaction solution was cooled to 80° C., and 5 parts by mass of triethylamine and 4000 parts by mass of deionized water were sequentially added thereto and mixed to obtain an aqueous epoxy resin (B3).

The aqueous epoxy resin (B3) had a weight-average molecular weight of 86000, an epoxy equivalent of 43000, an acid value of 19 mg KOH/g, and a glass transition temperature of 85° C.

Synthesis of Aqueous Epoxy Resin (B4)

To a flask having a condenser were added 114 parts by mass of 2,2-bis(4-hydroxyphenyl)propane, 56 parts by mass of epichlorohydrin, and 17 parts by mass of tetrabutylammonium bromide, and the mixture was reacted at 70° C. for 24 hours. Subsequently, the reaction solution was cooled to room temperature, 12 parts by mass of a 20% aqueous sodium hydroxide solution was added thereto, and the mixture was reacted at room temperature for about 5 hours. Then, a reaction product was extracted with chloroform.

To 590 parts by mass of the reaction product were added 43 parts by mass of glycidyl methacylate and 7 parts by mass of dimethylbenzylamine, and the mixture was reacted at 130° C. for 4 hours to obtain a reaction product (a4).

To 100 parts by mass of the reaction product (a4), a mixture including 1230 parts by mass of mixture having a mass ratio of methyl methacrylate/2-hydroxyethyl methacrylate/acrylic acid of 900:390:72 and 10 parts by mass of t-butylperoxy-2-ethylhexanoate was added dropwise over a period of 2 hours and reacted for 4 hours. Thereafter, the reaction solution was cooled to 80° C., and 5 parts by mass of triethylamine and 1800 parts by mass of deionized water were sequentially added thereto and mixed to obtain an aqueous epoxy resin (B4).

The aqueous epoxy resin (B4) had a weight-average molecular weight of 44000, an epoxy equivalent of 22000, an acid value of 38 mg KOH/g, and a glass transition temperature of 80° C.

Synthesis of Aqueous Epoxy Resin (B5)

To a flask having a condenser were added 670 parts by mass of dipropylene glycol, 560 parts by mass of epichlorohydrin, and 17 parts by mass of tetrabutylammonium bromide, and the mixture was reacted at 70° C. for 24 hours. Subsequently, the reaction solution was cooled to room temperature, 12 parts by mass of a 20% aqueous sodium hydroxide solution was added thereto, and the mixture was reacted at room temperature for about 5 hours. Then, a reaction product was extracted with chloroform.

To 400 parts by mass of the reaction product were added 43 parts by mass of glycidyl methacylate and 7 parts by mass of dimethylbenzylamine, and the mixture was reacted at 130° C. for 4 hours to obtain a reaction product (a5).

To 100 parts by mass of the reaction product (a5), a mixture including 870 parts by mass of mixture having a mass ratio of methyl methacrylate/2-hydroxyethyl methacrylate/n-butyl acrylate/acrylic acid of 500:260:128:72 and 10 parts by mass of t-butylperoxy-2-ethylhexanoate was added dropwise over a period of 2 hours and reacted for 4 hours. Thereafter, the reaction solution was cooled to 80° C., and 5 parts by mass of triethylamine and 2400 parts by mass of deionized water were sequentially added thereto and mixed to obtain an aqueous epoxy resin (B5).

The aqueous epoxy resin (B5) had a weight-average molecular weight of 32000, an epoxy equivalent of 16000, an acid value of 52 mg KOH/g, and a glass transition temperature of 30° C.

Synthesis of Aqueous Epoxy Resin (B6)

To a flask having a condenser were added 456 parts by mass of 2,2-bis(4-hydroxyphenyl)propane, 278 parts by mass of epichlorohydrin, and 17 parts by mass of tetrabutylammonium bromide, and the mixture was reacted at 70° C. for 24 hours. Subsequently, the reaction solution was cooled to room temperature, 12 parts by mass of a 20% aqueous sodium hydroxide solution was added thereto, and the mixture was reacted at room temperature for about 5 hours. Then, a reaction product was extracted with chloroform.

To 312 parts by mass of the reaction product were added 28 parts by mass of acrylamide and 7 parts by mass of dimethylbenzylamine, and the mixture was reacted at 130° C. for 4 hours to obtain a reaction product (a6).

To 100 parts by mass of the reaction product (a6), a mixture including 2200 parts by mass of mixture having a mass ratio of methyl methacrylate/2-hydroxyethyl methacrylate/n-butyl acrylate/acrylic acid of 800:390:640:36 and 10 parts by mass of t-butylperoxy-2-ethylhexanoate was added dropwise over a period of 2 hours and reacted for 4 hours. Thereafter, the reaction solution was cooled to 80° C., and 5 parts by mass of triethylamine and 5000 parts by mass of deionized water were sequentially added thereto and mixed to obtain an aqueous epoxy resin (B6).

The aqueous epoxy resin (B6) had a weight-average molecular weight of 78000, an epoxy equivalent of 39000, an acid value of 14 mg KOH/g, and a glass transition temperature of 70° C.

Synthesis of Aqueous Epoxy Resin (B7)

To a flask having a condenser were added 100 parts by mass of 2,2-bis(4-hydroxyphenyl)methane, 56 parts by mass of epichlorohydrin, and 17 parts by mass of tetrabutylammonium bromide, and the mixture was reacted at 70° C. for 24 hours. Subsequently, the reaction solution was cooled to room temperature, 12 parts by mass of a 20% aqueous sodium hydroxide solution was added thereto, and the mixture was reacted at room temperature for about 5 hours. Then, a reaction product was extracted with chloroform.

To 534 parts by mass of the reaction product were added 60 parts by mass of polyethylene glycol diglycidyl ether (EX-821, available from Nagase ChemteX Corporation) and 7 parts by mass of dimethylbenzylamine, and the mixture was reacted at 130° C. for 4 hours to obtain a reaction product (a7).

To 100 parts by mass of the reaction product (a7), a mixture including 241 parts by mass of mixture having a mass ratio of methyl methacrylate/2-hydroxyethyl methacrylate/acrylic acid of 300:130:14.4 and 5 parts by mass of t-butylperoxy-2-ethylhexanoate was added dropwise over a period of 2 hours and reacted for 4 hours. Thereafter, the reaction solution was cooled to 80° C., and 5 parts by mass of triethylamine and 700 parts by mass of deionized water were sequentially added thereto and mixed to obtain an aqueous epoxy resin (B7).

The aqueous epoxy resin (B7) had a weight-average molecular weight of 83000, an epoxy equivalent of 41500, an acid value of 24 mg KOH/g, and a glass transition temperature of 60° C.

(Measurement of Properties of Aqueous Epoxy Resin: Acid Value)

The acid values of the aqueous epoxy resins produced in the synthesis examples above were measured by potentiometric titration according to JIS K 0070-1992.

(Measurement of Properties of Aqueous Epoxy Resin: Glass Transition Temperature)

The glass transition temperatures of the aqueous epoxy resins produced in the synthesis examples above were measured by differential scanning calorimetry according to JIS K 7121-1987.

(Measurement of Properties of Aqueous Epoxy Resin: Weight-Average Molecular Weight)

The weight-average molecular weights of the aqueous epoxy resins produced in the synthesis examples above were measured as polystyrene-equivalent values by gel permeation chromatography.

(Measurement of Properties of Aqueous Epoxy Resin: Epoxy Equivalent)

The epoxy equivalents of the aqueous epoxy resins produced in the synthesis examples above were calculated through the measurement according to JIS K 7236-2001.

(2) Preparation of Inventive Treating Agent

Secondly, using the aqueous epoxy resins (B1) to (B7) above, ingredients were mixed in water at the compositions shown in Table 1 to obtain surface-treating agents for metallic materials. The solid concentration was 10 mass %.

In addition, referring to Patent Literature 2, a surface-treating agent was obtained according to Patent Literature 2 (Example 5).

The compounds (A), (C), (D) and (E) in Table 1 are described below.

A1: Zirconium hexafluoroacetylacetonato.
A2: Zirconium ammonium carbonate
A3: Zirconium sodium carbonate
C1: Tartaric acid
C2: Citric acid monohydrate
C3: Gluconic acid
D1: 3-Aminopropyltriethoxysilane
D2: Vinyltriethoxysilane
D3: Tetramethoxysilane
D4: 3-Glycidoxypropyltrimethoxysilane
E1: Polyethylene wax (Chemipearl W900, available from Mitsui Chemicals, Inc.)
E2: Polyethylene wax (Chemipearl WP100, available from Mitsui Chemicals, Inc.)
E3: Microcrystalline wax In Table 1, values (%) in the columns of "D" and "E" represent the amounts of the respective components with respect to the solid content.

(3) Production of Test Plate

Test plates were produced according to (3-1) to (3-4) below.

Note that (3-4) was carried out only in Examples 37 to 40 in the order of (3-1), (3-2), (3-4) and (3-3).

(3-1) Test Material

For test plates, the materials of (i) to (iv) were used as below.

(i) Cold-rolled steel sheet (SPCC): sheet thickness, 0.8 mm (ii) Electrogalvanized steel sheet (EG): sheet thickness, 0.8 mm; coating weight, 20/20 g/m$^2$ (iii) Galvanized steel sheet (GA): sheet thickness, 0.8 mm; coating weight, 45/45 g/m$^2$ (iv) 5000 series aluminum sheet (AL): sheet thickness, 0.9 mm (3-2) Rinsing Pretreatment The test plates were degreased with the alkaline degreasing agent (Finecleaner L4460, available from Nihon Parkerizing Co., Ltd.; Degreasing conditions: concentration of degreasing agent, 2.0 g/L; temperature of treatment solution, 45° C.; degreasing time, 120 seconds; spraying) to remove oil and dirt on their surfaces, in advance. Next, the surfaces of the test plates were rinsed with tap water and confirmed to be thoroughly (100%) wet by water. Then, pure water (deionized water) was poured and the test plates were dried in an oven at 100° C.

(3-3) Application Method of Surface-Treating Agent for Metallic Materials

After the rinsing pretreatment, the surface-treating agents for metallic materials at the compositions shown in Table 1 were optionally diluted with water to achieve specified coating thicknesses when applied with a bar coater, and dried in a hot air dryer so that the test plates had peak metal temperatures (PMT) as listed in Table 1.

(3-4) Cathodic Electrolysis (Preparation of Zn—Ni Electrolysis Treatment Solution)

Using reagents available from Wako Pure Chemical Industries, Ltd., 40 g/L of zinc chloride, 90 g/L of nickel chloride hexahydrate, 100 g/L of potassium chloride dihydrate and 30 g/L of boric acid were stirred and dissolved, and the resultant solution was adjusted with ammonia water to a pH of 3.5 to prepare a Zn—Ni electrolysis treatment solution.

(Preparation of Zn-Al Electrolysis Treatment Solution)

Using reagents available from Wako Pure Chemical Industries, Ltd., 40 g/L of zinc chloride, 50 g/L of aluminum nitrate nonahydrate, 100 g/L of potassium chloride dihydrate and 30 g/L of boric acid were stirred and dissolved, and the resultant solution was adjusted with ammonia water to a pH of 3.5 to prepare a Zn—Al electrolysis treatment solution.

(Preparation of Ce Electrolysis Treatment Solution)

Using reagents available from Wako Pure Chemical Industries, Ltd., 30 g/L of cerium sulfate tetrahydrate and 80 g/L of sodium sulfate were stirred and dissolved, and the resultant solution was adjusted with ammonia water to a pH of 4.0 to prepare a Ce electrolysis treatment solution.

(Preparation of Zr Electrolysis Treatment Solution)

Using reagents available from Wako Pure Chemical Industries, Ltd., 15 g/L of zirconium chloride and 80 g/L of ammonium nitrate were stirred and dissolved, and the resultant solution was adjusted with ammonia water to a pH of 3.0 to prepare a Zr electrolysis treatment solution.

(Preparation of Electrolysis Plate)

Each steel sheet having undergone the rinsing pretreatment of (3-2) was subjected to cathodic electrolysis in one of the electrolysis treatment solutions above with a SUS304 plate as a counter electrode at a current density of 2 to 10 A/dm$^2$ for 2 to 6 seconds. Immediately after cathodic electrolysis, the steel sheets were rinsed with water and dried. In all the cases, the electrolysis was performed at a treatment solution temperature of 25° C. The coating weight of metal was measured with fluorescent X-ray.

(Measurement of Coating Thickness)

In the measurement of coating thickness, cross-section samples were first produced using a focused ion beam system (FB2000A, available from Hitachi, Ltd.) and an associated microsampling device, and then the measurement was carried out with a transmission electron microscopy (TEM).

(4) Method of Evaluation Test

The surface-treated metallic materials obtained under the conditions shown in Table 1 were evaluated as mentioned in (4-1) to (4-8) below and the results are shown in Table 2. For the evaluation criteria, "Excellent" and "Good" are preferred in practical use.

(4-1) Evaluation of Initial Rust Resistance by Humidity Cabinet Test

A test piece (hereinafter simply called "sample") of 70×150 mm was cut from each of the surface-treated metallic materials obtained under the conditions shown in Table 1, each sample with its back and edge faces being covered by plastic tape underwent the humidity cabinet test (39° C., 95% RH) according to JIS K 2246 for a specified period of time, and the time taken for rust to occur on the surface of the sample was determined through visual observation. The evaluation was made based on the following criteria.

Excellent: 720 hours or more
Good: 480 hours or more but less than 720 hours
Fair: 240 hours or more but less than 480 hours
Poor: Less than 240 hours (4-2) Evaluation of Initial Rust Resistance by SST Each sample obtained under the conditions shown in Table 1 with its back and edge faces being covered by plastic tape underwent the salt spray test (SST) according to JIS Z 2371 2000. The ratio of red rust occurrence area after the elapse of a specified period of time was visually observed to evaluate corrosion resistance of a flat portion. The evaluation was made based on the following criteria.

(Evaluation Criteria for Cold-Rolled Steel Sheet (i))

24 hours after SST
Excellent: Red rust area ratio of less than 5%
Good: Red rust area ratio of 5% or more but less than 10%
Fair: Red rust area ratio of 10% or more but less than 30%
Poor: Red rust area ratio of 30% or more (Evaluation Criteria for Galvanized Steel Sheets (ii, iii) and Aluminum Sheet (iv))

72 hours after SST
Excellent: Red rust area ratio of less than 5%
Good: Red rust area ratio of 5% or more but less than 10%
Fair: Red rust area ratio of 10% or more but less than 30%
Poor: Red rust area ratio of 30% or more (4-3) Workability Evaluation Each surface-treated metallic material obtained under the conditions shown in Table 1 was cut into a disk shape with a diameter of 115 mm, and evaluated for lubrication using a high-speed deep drawing tester. The test was conducted under the following conditions to measure the limiting blank holder pressure.

Punch diameter: 50.0 mm Die diameter: 105.0 mm
Punch shoulder radius: 5 mm Die shoulder radius: 5 mm
Surface treatment: #1200 Punching speed: 60 m/min
Draw ratio: 2.3

The measurement results were evaluated based on the following criteria.

Excellent: 3.0 ton or more
Good: 2.0 ton or more but less than 3.0 ton
Fair: 0.5 ton or more but less than 2.0 ton
Poor: Less than 0.5 ton (4-4) Electrodeposition Painting Each sample obtained under the conditions shown in Table 1 was painted by electrodeposition in such a manner as defined in (a) or (b) below. The electrodeposition painting was performed with a cationic electrodeposition paint "GT- 10HT" available from Kansai Paint Co., Ltd. at a paint temperature of 28° C. The voltage was linearly boosted to 200 V in the first 30 seconds and then maintained at 200 V for 150 seconds. The electrodeposition painting was followed by rinsing with water, and the paint film was baked in an electric oven at 170° C. for 30 minutes. The film thickness after the electrodeposition painting was adjusted by suitably changing the application time of voltage which had reached 200 V, so as to fall in a range of 10 to 15 μm. The film thickness was measured by a coating thickness tester LZ-200J available from Kett Electric Laboratory.

(a) Electrodepositing painting after zinc phosphate chemical conversion treatment described below
(b) Electrodepositing painting without zinc phosphate chemical conversion treatment described below
(Zinc Phosphate Chemical Conversion Treatment)

Each sample obtained under the conditions shown in Table 1 was immersed in a 0.5% aqueous solution of zinc phosphate-based surface adjusting agent (PREPALENE X, available from Nihon Parkerizing Co., Ltd.), and then in a 5% aqueous solution of zinc phosphate chemical conversion treatment agent (PALBOND (registered trademark) L3020, available from Nihon Parkerizing Co., Ltd.) (bath temperature: 42° C.) for 120 seconds. Immediately after immersion, the sample was rinsed with water and dried.

(4-5) Evaluation of Corrosion Resistance after Electrodeposition Painting

Each test piece painted by electrodeposition was provided in its surface with a cross cut pattern by a cutter, and immersed in a 5% aqueous solution of NaCL at 55° C. for 240 hours. After immersion, the sample was allowed to stand at normal temperature for 1 day, and the paint film was peeled off with a tape in the cross cut portion. The one-side maximum peel width was measured, and the evaluation was made according to the following criteria.

(Evaluation Criteria for Cold-Rolled Steel Sheet (i) and Aluminum Sheet (iv))
Excellent: Peel width of less than 1.5 mm
Good: Peel width of 1.5 mm or more but less than 2.5 mm
Fair: Peel width of 2.5 mm or more but less than 3.5 mm
Poor: Peel width of 3.5 mm or more (Evaluation Criteria for Galvanized Steel Sheets (ii, iii))
Excellent: Peel width of less than 3.0 mm
Good: Peel width of 3.0 mm or more but less than 4.0 mm
Fair: Peel width of 4.0 mm or more but less than 5.0 mm
Poor: Peel width of 5.0 mm or more (4-6) Evaluation of Adhesion after Electrodeposition Painting Each test piece painted by electrodeposition was immersed in boiling deionized water for 240 hours, and then a set of 11 lines aligning in parallel at intervals of 1 mm and another set of 11 lines aligning in the same manner were cut in the painted surface with a cutter to cross each other at right angle to thereby form a grid-pattern cut scratches having 100 squares. Subsequently, after cellophane tape was applied on the grid-pattern portion and then peeled off, the number of squares in the grid pattern where the paint film was peeled off was evaluated according to the following criteria.
Excellent: 0
Good: 1 to 5
Fair: 6 to 10
Poor: 11 or more (4-7) Topcoat Painting
Melamine paint (AMILAC #1000, available from Kansai Paint Co., Ltd.) was applied on each sample obtained under the conditions shown in Table 1 so as to have a film thickness after baking and drying of 25 μm, and baked at 125° C. for 20 minutes.

(4-8) Evaluation of Paint Film Adhesion
Primary Adhesion
A set of 11 lines aligning in parallel at intervals of 1 mm and another set of 11 lines aligning in the same manner were cut in each topcoated test piece with a cutter to cross each other at right angle to thereby form a grid-pattern cut scratches having 100 squares. Subsequently, after cellophane tape was applied on the grid-pattern portion and then peeled off, the number of squares in the grid pattern where the paint film was peeled off was evaluated according to the following criteria (hereinafter called "grid-pattern test").
Excellent: 0
Good: 1 to 5
Fair: 6 to 10
Poor: 11 or more Secondary Adhesion
Each topcoated test piece was immersed in boiling deionized water for 2 hours and allowed to stand for 1 day, and the grid-pattern test was conducted for evaluation.
Excellent: 0
Good: 1 to 5
Fair: 6 to 10
Poor: 11 or more In Table 1, "PMT" represents the peak metal temperature.
In Table 1, "*1" denotes the mass ratio of C1:C2 being 1:1.
In Table 1, "*2" denotes the mass ratios of D1:D2 and D3:D4 being each 1:1.
In Table 1, "amount" in the columns of "D" and "E" represents the percent by mass with respect to the solid content.

TABLE 1

| | | | | Surface-treating agent for metallic material | | | | | Blended ratio | |
|---|---|---|---|---|---|---|---|---|---|---|
| | | | | Blended component | | | | | (weight ratio) | |
| | | | | | C(*1) | D(*2) | | E | | |
| Category | No | A | B | Type | Type | Amount | Type | Amount | $A_{Zr}/B$ | C/B |
| (Part 1) | | | | | | | | | | |
| Example | 1 | A2 | B3 | C1 | — | — | — | — | 0.08 | 0.14 |
| Example | 2 | A2 | B3 | C1 | — | — | — | — | 0.18 | 0.13 |
| Example | 3 | A2 | B3 | C1 | — | — | — | — | 0.50 | 0.14 |
| Example | 4 | A2 | B3 | C1 | — | — | — | — | 4.50 | 0.14 |
| Example | 5 | A2 | B3 | C1 | — | — | — | — | 6.60 | 0.13 |
| Example | 6 | A1 | B6 | C1 | — | — | — | — | 0.4 | 0.008 |
| Example | 7 | A1 | B6 | C1 | — | — | — | — | 0.4 | 0.02 |

TABLE 1-continued

| Category | No | | | | | | | | |
|---|---|---|---|---|---|---|---|---|---|
| Example | 8 | A1 | B6 | C1 | — | — | — | — | 0.4 | 0.15 |
| Example | 9 | A1 | B6 | C1 | — | — | — | — | 0.4 | 0.30 |
| Example | 10 | A1 | B6 | C1 | — | — | — | — | 0.4 | 0.70 |
| Example | 11 | A2 | B6 | C1 | — | — | — | — | 0.4 | 0.70 |
| Example | 12 | A3 | B6 | C1 | — | — | — | — | 0.4 | 0.70 |
| Example | 13 | A1 | B2 | C2 | — | — | — | — | 0.4 | 0.12 |
| Example | 14 | A1 | B3 | C2 | — | — | — | — | 0.4 | 0.12 |
| Example | 15 | A1 | B4 | C2 | — | — | — | — | 0.4 | 0.12 |
| Example | 16 | A1 | B4 | C1 | — | — | — | — | 0.4 | 0.12 |
| Example | 17 | A1 | B4 | C3 | — | — | — | — | 0.4 | 0.12 |
| Example | 18 | A2 | B3 | C2 | — | — | — | — | 0.4 | 0.05 |
| Example | 19 | A2 | B3 | C2 | D1 + D4 | 10% | — | — | 0.4 | 0.05 |
| Example | 20 | A2 | B3 | C2 | D3 + D4 | 5% | — | — | 0.4 | 0.05 |
| Example | 21 | A2 | B3 | C2 | D3 | 2% | — | — | 0.4 | 0.05 |
| Example | 22 | A2 | B3 | C2 | D2 | 5% | — | — | 0.4 | 0.05 |
| Example | 23 | A2 | B3 | C2 | D4 | 5% | — | — | 0.4 | 0.05 |
| Example | 24 | A3 | B3 | C3 | D1 | 5% | — | — | 0.4 | 0.05 |
| (Part 2) | | | | | | | | | | |
| Example | 25 | A3 | B3 | C2 | D1 | 8% | E1 | 5% | 0.4 | 0.05 |
| Example | 26 | A3 | B3 | C2 | D1 | 8% | E2 | 5% | 0.4 | 0.05 |
| Example | 27 | A3 | B3 | C2 | D1 | 8% | E3 | 5% | 0.4 | 0.05 |
| Example | 28 | A3 | B3 | C2 | D1 | 8% | E1 | 10% | 0.4 | 0.05 |
| Example | 29 | A3 | B3 | C2 | D1 | 10% | E1 | 20% | 0.4 | 0.05 |
| Example | 30 | A3 | B3 | C2 | D1 | 5% | E1 | 0.5% | 0.4 | 0.05 |
| Example | 31 | A3 | B6 | C3 | — | — | — | — | 0.7 | 0.08 |
| Example | 32 | A3 | B6 | C3 | — | — | — | — | 0.7 | 0.08 |
| Example | 33 | A3 | B6 | C3 | — | — | — | — | 0.7 | 0.08 |
| Example | 34 | A3 | B6 | C3 | — | — | — | — | 0.7 | 0.08 |
| Example | 35 | A3 | B6 | C3 | — | — | — | — | 0.7 | 0.08 |
| Example | 36 | A2 | B7 | C1 + C2 | — | — | — | — | 0.7 | 0.10 |
| Example | 37 | A2 | B7 | C1 + C2 | — | — | — | — | 0.7 | 0.10 |
| Example | 38 | A2 | B7 | C1 + C2 | — | — | — | — | 0.7 | 0.10 |
| Example | 39 | A2 | B7 | C1 + C2 | — | — | — | — | 0.7 | 0.10 |
| Example | 40 | A2 | B7 | C1 + C2 | — | — | — | — | 0.7 | 0.10 |
| Example | 41 | A2 | B3 | C2 | — | — | — | — | 0.7 | 0.10 |
| Example | 42 | A2 | B3 | C2 | — | — | — | — | 0.7 | 0.10 |
| Example | 43 | A2 | B3 | C2 | — | — | — | — | 0.7 | 0.10 |
| Comparative example | 44 | | | Patent literature 2 Example 5 | | | | | | |
| Comparative example | 45 | — | B3 | C1 | — | — | — | — | — | 0.10 |
| Comparative example | 46 | A2 | B3 | C1 | — | — | — | — | 0.07 | 0.14 |
| Comparative example | 47 | A2 | B3 | C1 | — | — | — | — | 6.80 | 0.14 |
| Comparative example | 48 | A1 | B6 | — | — | — | — | — | 0.50 | — |
| Comparative example | 49 | A1 | — | C1 | — | — | — | — | 0.50 | — |
| Comparative example | 50 | A1 | B6 | C1 | — | — | — | — | 0.18 | 0.005 |
| Comparative example | 51 | A1 | B6 | C1 | — | — | — | — | 1.11 | 0.8 |
| Comparative example | 52 | A1 | B1 | C2 | — | — | — | — | 0.4 | 0.12 |
| Comparative example | 53 | A1 | B5 | C2 | — | — | — | — | 0.4 | 0.12 |

| | | | | Treatment condition | | | |
|---|---|---|---|---|---|---|---|
| | | | | | Surface preparation | | |
| Category | No | Steel sheet | Coating thickness μm | PMT ° C. | Type | Cathodic electrolysis | Time | Coating weight of metal mg/m² |

(Part 1)

| Category | No | Steel sheet | Coating thickness μm | PMT ° C. | Type | Cathodic electrolysis | Time | Coating weight of metal mg/m² |
|---|---|---|---|---|---|---|---|---|
| Example | 1 | SPCC | 1.0 | 140 | — | — | — | — |
| Example | 2 | SPCC | 1.0 | 140 | — | — | — | — |
| Example | 3 | SPCC | 1.0 | 140 | — | — | — | — |
| Example | 4 | SPCC | 1.0 | 140 | — | — | — | — |
| Example | 5 | SPCC | 1.0 | 140 | — | — | — | — |
| Example | 6 | SPCC | 0.8 | 150 | — | — | — | — |
| Example | 7 | SPCC | 0.8 | 150 | — | — | — | — |
| Example | 8 | SPCC | 0.8 | 150 | — | — | — | — |
| Example | 9 | SPCC | 0.8 | 150 | — | — | — | — |
| Example | 10 | SPCC | 0.8 | 150 | — | — | — | — |

TABLE 1-continued

| Category | No | Substrate | | | | | | |
|---|---|---|---|---|---|---|---|---|
| Example | 11 | SPCC | 0.8 | 150 | — | — | — | — |
| Example | 12 | SPCC | 0.8 | 150 | — | — | — | — |
| Example | 13 | SPCC | 1.2 | 150 | — | — | — | — |
| Example | 14 | SPCC | 1.2 | 150 | — | — | — | — |
| Example | 15 | SPCC | 1.2 | 150 | — | — | — | — |
| Example | 16 | SPCC | 1.2 | 150 | — | — | — | — |
| Example | 17 | SPCC | 1.2 | 150 | — | — | — | — |
| Example | 18 | SPCC | 0.8 | 120 | — | — | — | — |
| Example | 19 | SPCC | 0.8 | 120 | — | — | — | — |
| Example | 20 | SPCC | 0.8 | 120 | — | — | — | — |
| Example | 21 | SPCC | 0.8 | 120 | — | — | — | — |
| Example | 22 | SPCC | 0.8 | 120 | — | — | — | — |
| Example | 23 | SPCC | 0.8 | 120 | — | — | — | — |
| Example | 24 | SPCC | 0.8 | 120 | — | — | — | — |

(Part 2)

| Category | No | Substrate | | | | | | |
|---|---|---|---|---|---|---|---|---|
| Example | 25 | SPCC | 0.8 | 120 | — | — | — | — |
| Example | 26 | SPCC | 0.8 | 120 | — | — | — | — |
| Example | 27 | SPCC | 0.8 | 120 | — | — | — | — |
| Example | 28 | SPCC | 0.8 | 100 | — | — | — | — |
| Example | 29 | SPCC | 0.8 | 100 | — | — | — | — |
| Example | 30 | SPCC | 0.8 | 100 | — | — | — | — |
| Example | 31 | SPCC | 0.3 | 120 | — | — | — | — |
| Example | 32 | SPCC | 0.5 | 120 | — | — | — | — |
| Example | 33 | SPCC | 1.5 | 120 | — | — | — | — |
| Example | 34 | SPCC | 3.0 | 120 | — | — | — | — |
| Example | 35 | SPCC | 5.0 | 120 | — | — | — | — |
| Example | 36 | SPCC | 0.8 | 120 | — | — | — | — |
| Example | 37 | SPCC | 0.8 | 120 | Zn—Ni | 10 A/dm$^2$ | 2 sec | 300 |
| Example | 38 | SPCC | 0.8 | 120 | Zn-AL | 5 A/dm$^2$ | 4 sec | 300 |
| Example | 39 | SPCC | 0.8 | 120 | Ce | 4 A/dm$^2$ | 4 sec | 200 |
| Example | 40 | SPCC | 0.8 | 120 | Zr | 4 A/dm$^2$ | 6 sec | 200 |
| Example | 41 | GA | 0.8 | 120 | — | — | — | — |
| Example | 42 | EG | 0.8 | 120 | — | — | — | — |
| Example | 43 | AL | 0.8 | 120 | — | — | — | — |
| Comparative example | 44 | SPCC | 1.5 | 140 | — | — | — | — |
| Comparative example | 45 | SPCC | 1.0 | 140 | — | — | — | — |
| Comparative example | 46 | SPCC | 1.0 | 140 | — | — | — | — |
| Comparative example | 47 | SPCC | 1.0 | 140 | — | — | — | — |
| Comparative example | 48 | SPCC | 0.8 | 150 | — | — | — | — |
| Comparative example | 49 | SPCC | 0.8 | 150 | — | — | — | — |
| Comparative example | 50 | SPCC | 0.8 | 150 | — | — | — | — |
| Comparative example | 51 | SPCC | 0.8 | 150 | — | — | — | — |
| Comparative example | 52 | SPCC | 1.2 | 150 | — | — | — | — |
| Comparative example | 53 | SPCC | 1.2 | 150 | — | — | — | — |

TABLE 2

| | | Property evaluation | | | | | | | | |
|---|---|---|---|---|---|---|---|---|---|---|
| | | Pre-painting properties | | | Post-painting properties | | | | | |
| | | Initial rust resistance | | | Electrodeposition painting properties (a) with pretreatment | | Electrodeposition painting properties (b) without pretreatment | | Topcoat properties | |
| | | Humidity Cabinet | | | | | | | Adhesion | |
| Category | No | Test | SST | Workability | Corrosion resistance | Adhesion | Corrosion resistance | Adhesion | Primary | Secondary |
| (Part 1) | | | | | | | | | | |
| Example | 1 | Good | Good | Good | Good | Good | Good | Good | Excellent | Good |
| Example | 2 | Excellent | Excellent | Good | Excellent | Good | Excellent | Good | Excellent | Good |
| Example | 3 | Excellent | Excellent | Good | Excellent | Excellent | Excellent | Excellent | Excellent | Excellent |

TABLE 2-continued

| | | Property evaluation | | | | | | | |
|---|---|---|---|---|---|---|---|---|---|
| | | Pre-painting properties | | Post-painting properties | | | | | |
| | | Initial rust resistance | | Electrodeposition painting properties (a) with pretreatment | | Electrodeposition painting properties (b) without pretreatment | | Topcoat properties | |
| | | Humidity Cabinet | | Corrosion | | Corrosion | | Adhesion | |
| Category | No | Test | SST | Workability | resistance | Adhesion | resistance | Adhesion | Primary | Secondary |
| Example | 4 | Excellent | Excellent | Good | Excellent | Excellent | Excellent | Excellent | Excellent | Excellent |
| Example | 5 | Good | Good | Good | Good | Good | Good | Good | Good | Good |
| Example | 6 | Good | Good | Good | Good | Good | Good | Good | Excellent | Good |
| Example | 7 | Excellent | Excellent | Good | Excellent | Good | Excellent | Good | Excellent | Good |
| Example | 8 | Excellent | Excellent | Good | Excellent | Excellent | Excellent | Excellent | Excellent | Excellent |
| Example | 9 | Excellent | Excellent | Good | Excellent | Excellent | Excellent | Excellent | Excellent | Excellent |
| Example | 10 | Good | Good | Good | Excellent | Good | Excellent | Good | Excellent | Good |
| Example | 11 | Excellent | Good | Good | — | — | Excellent | Good | Excellent | Good |
| Example | 12 | Excellent | Good | Good | — | — | Excellent | Good | Excellent | Good |
| Example | 13 | Good | Good | Good | — | — | Good | Good | Good | Good |
| Example | 14 | Excellent | Excellent | Good | — | — | Excellent | Good | Excellent | Good |
| Example | 15 | Good | Good | Excellent | — | — | Excellent | Good | Excellent | Good |
| Example | 16 | Good | Good | Excellent | — | — | Excellent | Good | Excellent | Good |
| Example | 17 | Good | Good | Excellent | — | — | Good | Good | Excellent | Good |
| Example | 18 | Excellent | Good | Good | Excellent | Good | Excellent | Good | Excellent | Good |
| Example | 19 | Excellent | Excellent | Good | Excellent | Excellent | Excellent | Excellent | Excellent | Excellent |
| Example | 20 | Excellent | Excellent | Good | — | — | Excellent | Excellent | Excellent | Excellent |
| Example | 21 | Excellent | Excellent | Good | — | — | Excellent | Good | Excellent | Good |
| Example | 22 | Excellent | Excellent | Good | — | — | Excellent | Excellent | Excellent | Excellent |
| Example | 23 | Excellent | Excellent | Good | — | — | Excellent | Excellent | Excellent | Excellent |
| Example | 24 | Excellent | Excellent | Good | — | — | Excellent | Excellent | Excellent | Excellent |
| | | | | (Part 2) | | | | | | |
| Example | 25 | Excellent | Excellent | Excellent | Excellent | Excellent | Excellent | Excellent | Excellent | Excellent |
| Example | 26 | Excellent | Excellent | Excellent | — | — | Excellent | Excellent | Excellent | Excellent |
| Example | 27 | Excellent | Excellent | Excellent | — | — | Excellent | Excellent | Excellent | Excellent |
| Example | 28 | Excellent | Excellent | Excellent | — | — | Excellent | Excellent | Excellent | Excellent |
| Example | 29 | Excellent | Excellent | Excellent | — | — | Excellent | Excellent | Excellent | Excellent |
| Example | 30 | Excellent | Excellent | Excellent | — | — | Excellent | Excellent | Excellent | Excellent |
| Example | 31 | Good | Good | Good | — | — | Good | Good | Good | Good |
| Example | 32 | Excellent | Excellent | Good | — | — | Excellent | Good | Excellent | Good |
| Example | 33 | Excellent | Excellent | Excellent | — | — | Excellent | Good | Excellent | Good |
| Example | 34 | Excellent | Excellent | Excellent | — | — | Excellent | Good | Excellent | Good |
| Example | 35 | Excellent | Excellent | Good | — | — | Excellent | Good | Good | Good |
| Example | 36 | Excellent | Good | Good | — | — | Excellent | Excellent | Excellent | Excellent |
| Example | 37 | Excellent | Excellent | Good | — | — | Excellent | Excellent | Excellent | Excellent |
| Example | 38 | Excellent | Excellent | Good | Excellent | Excellent | Excellent | Excellent | Excellent | Excellent |
| Example | 39 | Excellent | Excellent | Good | — | — | Excellent | Excellent | Excellent | Excellent |
| Example | 40 | Excellent | Excellent | Good | — | — | Excellent | Excellent | Excellent | Excellent |
| Example | 41 | Excellent | Excellent | Good | Excellent | Excellent | Excellent | Excellent | Excellent | Excellent |
| Example | 42 | Excellent | Excellent | Good | — | — | Excellent | Excellent | Excellent | Excellent |
| Example | 43 | Excellent | Excellent | Good | — | — | Excellent | Excellent | Excellent | Excellent |
| Comparative example | 44 | Excellent | Poor | Good | — | — | Fair | Excellent | Excellent | Excellent |
| Comparative example | 45 | Poor | Poor | Good | — | — | Poor | Poor | Good | Poor |
| Comparative example | 46 | Fair | Fair | Good | — | — | Fair | Fair | Good | Fair |
| Comparative example | 47 | Fair | Fair | Fair | — | — | Fair | Fair | Fair | Fair |
| Comparative example | 48 | Poor | Poor | Good | — | — | Poor | Poor | Good | Poor |
| Comparative example | 49 | Poor | Poor | Good | — | — | Poor | Poor | Good | Poor |
| Comparative example | 50 | | | | Production of solution was impossible | | | | | |
| Comparative example | 51 | Fair | Fair | Good | — | — | Excellent | Fair | Good | Fair |
| Comparative example | 52 | Fair | Fair | Fair | — | — | Fair | Fair | Fair | Fair |
| Comparative example | 53 | Fair | Fair | Excellent | — | — | Excellent | Good | Good | Good |

As can be seen from Table 1, it was confirmed that with the surface-treating agents for metallic materials according to the invention, the desired effects were obtained. The comparison of Examples 1 to 5 with Examples 6 to 10 revealed that there were ranges of the ratio between the zirconium compound (A), the aqueous epoxy resin (B) and the hydroxycarboxylic acid (C) in which ranges a certain characteristic was superior.

In Comparative Examples that did not satisfy predetermined conditions, the desired effects were not obtained. For example, Comparative Examples 45, 48 and 49 revealed that when any of the zirconium compound (A), the aqueous epoxy resin (B) and the hydroxycarboxylic acid (C) was not present, the properties aimed at by the invention were not obtained.

It was revealed that, with the composition of Comparative Example 44 using the technique of Patent Literature 2, the initial rust resistance was not achieved in the SST, in particular.

The invention claimed is:

1. A surface-treating agent for metallic materials, comprising:
   a zirconium compound (A);
   an aqueous epoxy resin (B) having, in its skeleton, a carboxyl group-containing polymer containing a repeating unit derived from a carboxyl group-containing vinyl monomer, and having an acid value of 5 to 50 mg KOH/g; and
   a hydroxycarboxylic acid (C),
   wherein following conditions (I) and (II) are satisfied:
   (I) a ratio between a weight of Zr derived from the zirconium compound (A) ($A_{Zr}$) and a weight of the aqueous epoxy resin (B) ($A_{Zr}/B$) is 0.08 to 6.6; and
   (II) a ratio between the weight of the aqueous epoxy resin (B) and a weight of the hydroxycarboxylic acid (C) (C/B) is 0.008 to 0.7.

2. The surface-treating agent for metallic materials according to claim 1 further comprising:
   a silane compound (D).

3. The surface-treating agent for metallic materials according to claim 1 further comprising:
   an aqueous lubricant (E).

4. The surface-treating agent for metallic materials according to claim 2 further comprising:
   an aqueous lubricant (E).

5. A method of producing a surface-treated metallic material, comprising:
   a coating formation step of forming a coating on a metallic material to obtain a surface-treated metallic material by bringing the surface-treating agent for metallic materials according to claim 1 into contact with a surface of the metallic material.

6. The method according to claim 5, wherein the coating has a thickness of 0.3 to 5.0 µm.

7. A method of producing a surface-treated metallic material, comprising:
   a coating formation step of forming a coating on a metallic material to obtain a surface-treated metallic material by bringing the surface-treating agent for metallic materials according to claim 2 into contact with a surface of the metallic material.

8. The method according to claim 7, wherein the coating has a thickness of 0.3 to 5.0 µm.

9. A method of producing a surface-treated metallic material, comprising:
   a coating formation step of forming a coating on a metallic material to obtain a surface-treated metallic material by bringing the surface-treating agent for metallic materials according to claim 3 into contact with a surface of the metallic material.

10. The method according to claim 9, wherein the coating has a thickness of 0.3 to 5.0 µm.

11. A method of producing a surface-treated metallic material, comprising:
    a coating formation step of forming a coating on a metallic material to obtain a surface-treated metallic material by bringing the surface-treating agent for metallic materials according to claim 4 into contact with a surface of the metallic material.

12. The method according to claim 11, wherein the coating has a thickness of 0.3 to 5.0 µm.

13. The method according to claim 5, further comprising:
    a step of, prior to the coating formation step, bringing the surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom.

14. The method according to claim 6, further comprising:
    a step of, prior to the coating formation step, bringing the surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom.

15. The method according to claim 7, further comprising:
    a step of, prior to the coating formation step, bringing the surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom.

16. The method according to claim 8, further comprising:
    a step of, prior to the coating formation step, bringing the surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom.

17. The method according to claim 9, further comprising:
    a step of, prior to the coating formation step, bringing the surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom.

18. The method according to claim 10, further comprising:
    a step of, prior to the coating formation step, bringing the surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom.

19. The method according to claim 11, further comprising:
    a step of, prior to the coating formation step, bringing the surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom.

20. The method according to claim 12, further comprising:
a step of, prior to the coating formation step, bringing the surface of the metallic material into contact with a solution containing a metal ion of at least one metal atom selected from the group consisting of Mo, W, Y, Bi, Mn, La, Ce, Sm, Zn, AL, Si, Ni, Co, Zr, Mg, Ti and V and/or a metal compound including the one metal atom.

21. The surface-treating agent for metallic materials according to claim 1, wherein said ratio between a weight of Zr derived from the zirconium compound (A) ($A_{Zr}$) and a weight of the aqueous epoxy resin (B) ($A_{Zr}/B$) is 0.18 to 4.5.

22. The surface-treating agent for metallic materials according to claim 1, wherein said ratio between the weight of the aqueous epoxy resin (B) and a weight of the hydroxycarboxylic acid (C) (C/B) is 0.02 to 0.3.

23. The surface-treating agent for metallic materials according to claim 21, wherein said ratio between the weight of the aqueous epoxy resin (B) and a weight of the hydroxycarboxylic acid (C) (C/B) is 0.02 to 0.3.

* * * * *